April 14, 1970 J. S. STONE 3,506,815

BINARY CONVERTER

Filed Dec. 28, 1966 3 Sheets-Sheet 1

INVENTOR.
JAMES S. STONE

BY Moody & Hallacher

ATTORNEYS

| BCD CODE D | C | B | A | DIGIT OUTPUT |
|---|---|---|---|---|
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |

INVENTOR.
JAMES S. STONE
BY Moody & Hallacher
ATTORNEYS

April 14, 1970 J. S. STONE 3,506,815

BINARY CONVERTER

Filed Dec. 28, 1966 3 Sheets-Sheet 3

INVENTOR.
JAMES S. STONE
BY Moody & Hallacher
ATTORNEYS

United States Patent Office 3,506,815
Patented Apr. 14, 1970

3,506,815
BINARY CONVERTER

James S. Stone, Cedar Rapids, Iowa, assignor to Collins Radio Company, Cedar Rapids, Iowa, a corporation of Iowa Filed Dec. 28, 1966, Ser. No. 605,508
Int. Cl. H03k *13/00;* G06f *5/02*
U.S. Cl. 235—155 3 Claims

ABSTRACT OF THE DISCLOSURE

Binary coded data present on four input lines is converted into decade logic information present on ten output lines. For a given combination of input signals only one of the ten output lines contains a logic "1" while the remaining nine contain a logic "0." The conversion is made by the use of known logic circuits primarily consisting of AND, NAND, OR, NOR and inverter circuitry.

This invention relates generally to logic circuits and particularly to a system for converting binary coded decimal (BCD) into decade digital information contained on ten output leads.

Many various types of control systems used in the art today operate on digital information. In many instances the digital information is binary coded into a four-wire system. In such systems each wire contains either a "1" or a "0" with the particular combination representing a different function in the system. It can be shown by the use of Boolean algebra that the information contained on the four leads can be separated into fifteen digital outputs. The digital outputs which can be present in pulse form or as continuous signals each separately represent a particular combination of four input signals on the four-wire system. Such a system has fifteen output leads and four input leads. The particular combination of 1's and 0's on the input leads results in a 1 on a single output lead and a 0 on all remaining output leads. The particular output lead containing the 1 is determined by the order of 1's and 0's on the input leads. It is therefore evident that a system which converts the four-wire information into fifteen digital outputs would be capable of more control functions by using the fifteen-wire output than if it used the original four-wire input system. Obviously, the number of output leads can be decreased to any desired number. Many types of equipment today use decade, or ten step information. The system described herein uses ten output leads. Examples of equipments which could readily use ten-wire digital information are automatic positioning for aircraft, automatic decade tuners in radio equipment and any other similar equipment which operates on digital inputs.

It is therefore an object of this invention to provide a system for converting the four-wire binary coded decimal, BCD, into decade digital outputs.

It is another object of this invention to provide such a system which utilizes well-known logic circuitry.

Further objects, features, and advantages of the invention will become apparent from the following description and claims when read in view of the accompanying drawings wherein like numbers indicate like parts and in which:

Figure 6C:
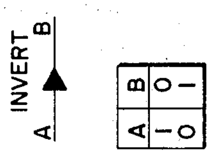
FIGURES 6*a*, *b*, and *c* show the well-known logic circuitry which is used in the inventive systems.
Figure 6B:
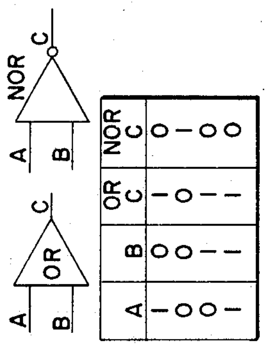
Figure 6A:
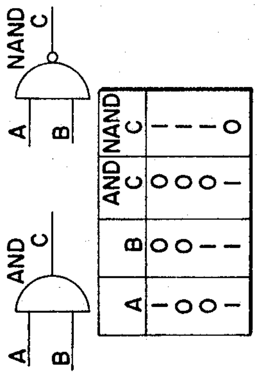

FIGURES 6*a*, 6*b*, and 6*c* show the symbols and logic of the logic circuitry used in the instant invention. FIGURE 6*a* shows the AND and NAND gate symbols and the logic table associated with each. It should be noted that NAND gate is the inverse of the AND. Any combination of inputs of an AND resulting in a "1" output, results in a "0" output for the NAND. A NAND is therefore usually called a NOT AND and when AND is written A, NAND is writter $\overline{A}$. The same relationship is true of OR and NOR gates. All these circuits are well-known and are included for convenience when reading the operation of instant invention.

Figure 1:
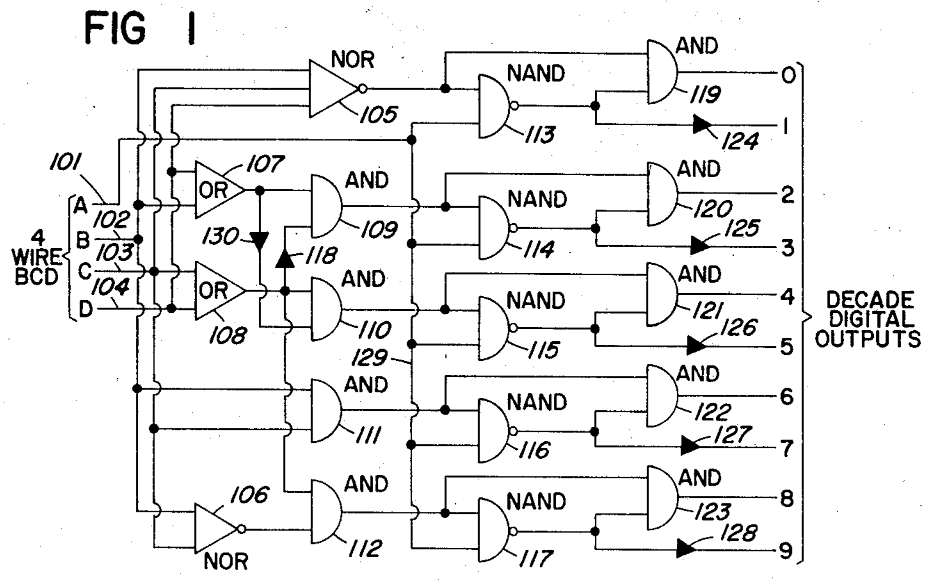
FIGURE 1 shows a first embodiment of the inventive system.
Figure 2:
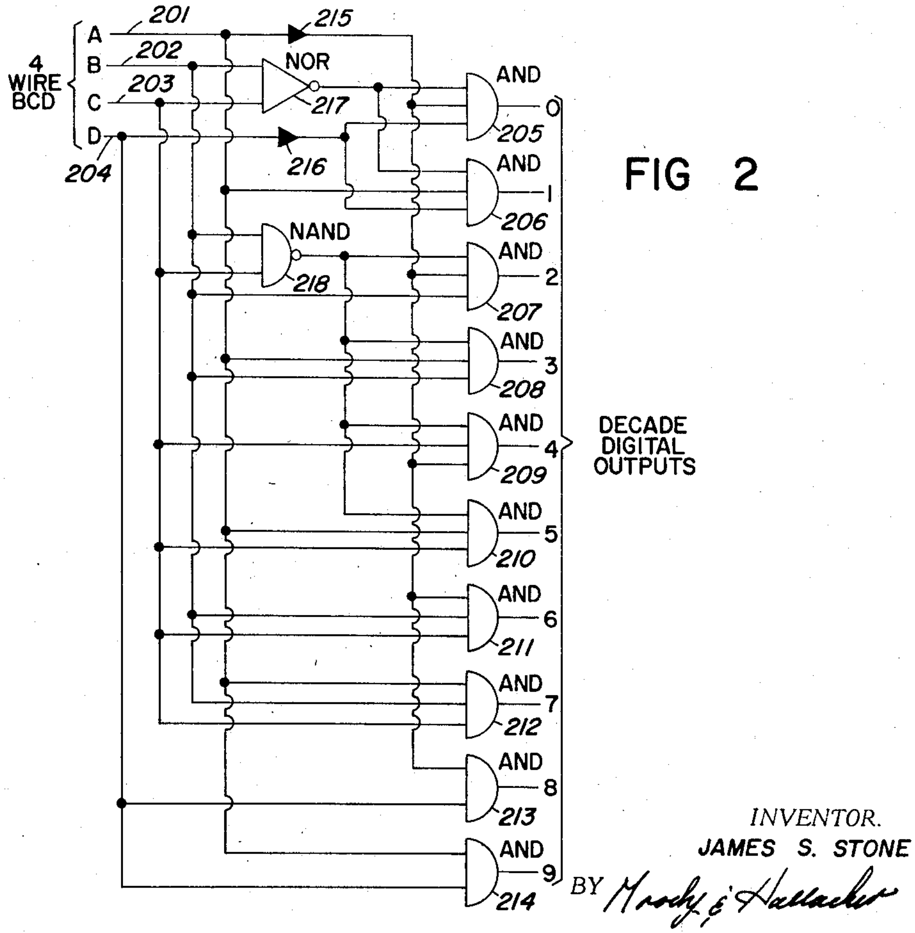
FIGURE 2 shows a second embodiment of the inventive system which contains less logic circuitry than the embodiment of FIGURE 1.
Figures 3, 4:
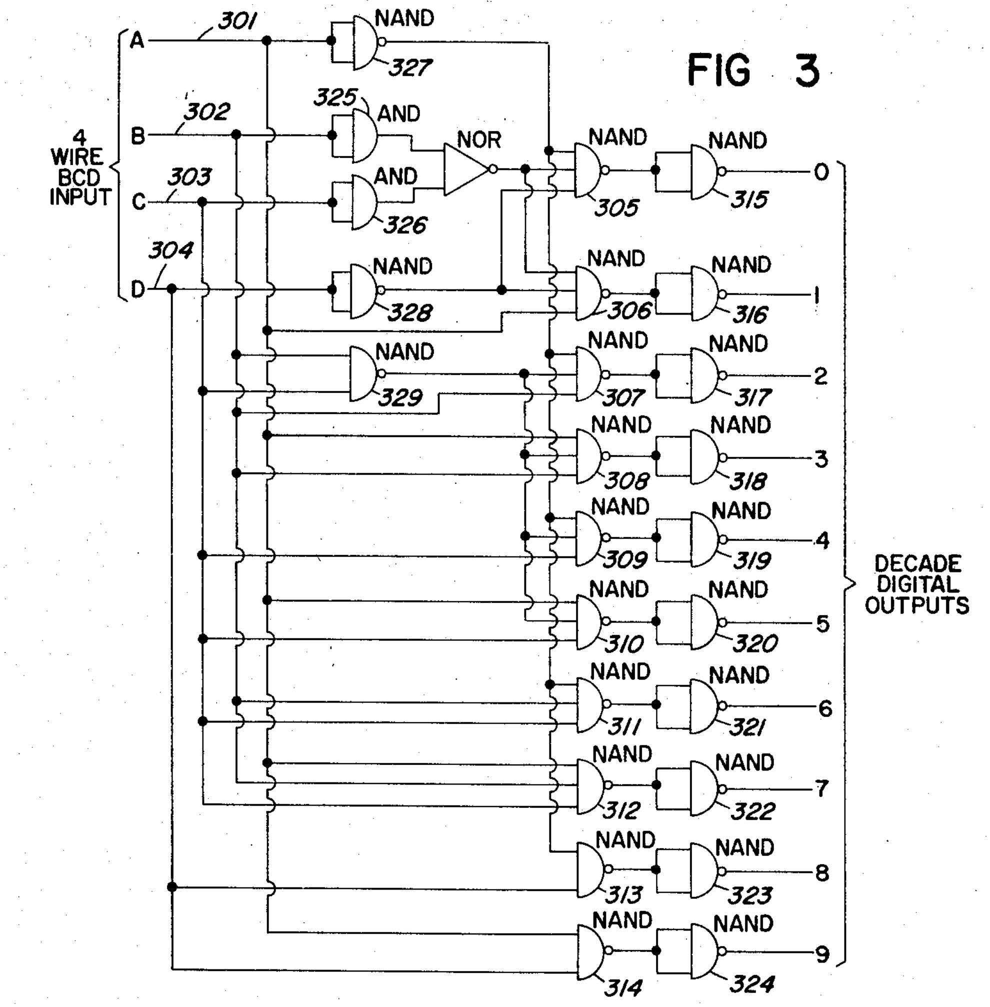
FIGURE 3 shows a third embodiment of the inventive system which is readily assembled from commercially available thin film circuitry.
FIGURE 4 shows a truth table which is applicable to the three embodiments shown in FIGURES 1 through 3.
Figure 5:
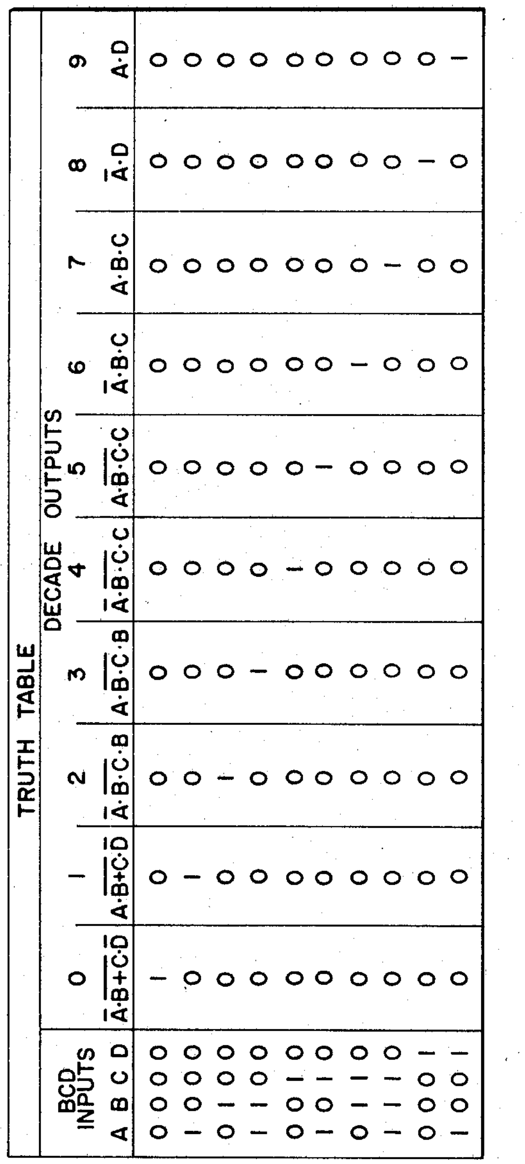
FIGURE 5 shows a truth table which is applicable to the three embodiments of FIGURES 1, 2, and 3.

FIGURE 5 shows the truth table applicable to the three embodiments shown in FIGURES 1, 2, and 3. This table is actually the complete table and is comparable to the table of FIGURE 4. The Boolean equations appearing at the top of the 0 to 9 columns are another way of expressing the BCD inputs shown in the left-hand column.

Referring now to FIGURE 1, four-wire BCD is received by lines 101 to 104 respectively identified as A, B, C, and D to be consistent with the logic table shown in FIGURE 4.

Two NOR gates 105 and 106 and two OR gates 107 and 108 are connected to receive the various inputs from lines 101 to 104. NOR gate 105 is a three input connected to input lines to receive B, C, and D information. OR gate 107 receives B and D information; OR gate 108 receives C and D information, while NOR gate 106 receives B and C information. A series of AND gates 109 to 112 are used to actuate a series of NAND gates 113 to 117. AND gate 109 receives a first input from OR 107 and a second input from OR 108 through inverter 118. AND 110 receives a first input from OR 108 and a second input from OR 107 through inverter 130. AND 111 is directly coupled to input lines 102 and 103 to receive B and C information. AND 112 receives a first input from OR 108 and a second from NOR 106. A second series of AND circuits 119 to 123 each respectively receive an input from NAND gates 113 to 117. AND gates 119 to 123 each receive an input which is common to an input of the respective NAND gate from which it receives its other input. (The second input of AND 119 is received from NOR 105.) The outputs of AND gates 119 to 123 respectively represent the digital output 0, 2, 4, 6, and 8. A series of inverters 124 to 128 respectively receive the outputs of NAND gates 113 to 117, the outputs of the inverters respectively being the 1, 3, 5, 7, and 9 digital outputs. The outputs of the five AND gates 119 to 123 and the five inverters 124 to 128 therefore serve as the ten digital outputs represented as 0 to 9.

In operation when a particular four-wire code is present on the input lines 101 through 104 one of the ten available output lines will contain a constant logic "1" output and all others will contain a constant logic "0" output. The outputs remain in this state until there is a change in the state of the inputs. Referring to the logic table of FIGURE 4 assume the digit 2 information is available on the input lines 101 to 104. This input would place a "0" on lines A, C, and D and a "1" on line B. The output lines then should all contain a "0" except the digit 2, which is the output of AND 120, which should contain a "1." The achievement of this is easily followed through by first referring to line 101 which contains the "A" information. Each of the NAND circuits 113 through 117 receives a "0" on one input because of their connection to line 101 via line 129. The output of each of said NAND gates is therefore a "1." This is easily seen by referring to FIGURE 6*a*, which shows the NAND gate logic. Inverters 124 through 128 invert the "1" to a "0" and therefore the lines 1, 3, 5, 7, and 9 immediately are seen to each contain a "0" output as required by the logic table of FIGURE 4. Referring to NOR 105, it is noted that it receives a "1" input from line 102, which is the B line. The output of NOR 105 is therefore a "0." This serves as an input to AND gate 119 and therefore the output on the 0 line is a "0." The output of OR 108 is a "0" which is inverted to a "1" by inverter 118. One input of AND 109 therefore is a "1." The ouput of OR 107, which is an input to AND 109, is also a "1" and therefore the output of AND 109 is a "1." This output is applied to one input of AND 120 and the "1" output of NAND 114 is applied to the other input of AND 120 and therefore the output of AND 120, which is the digit 2 output line, is a "1" as required by the logic table. An AND 110 has as one of its inputs the "0" from OR 108. Consequently its output is a "0" which serves as one of the inputs to AND 121 and therefore the digit 4 output of AND 121 is a "0" as required by the logic table. The output of AND 111 is a "0" because of the "0" input received from line 103. This output serves as one of the inputs to AND 122 and therefore the digit 6 output is also a "0" as required by the logic table. AND 112 also receives the "0" output from OR 108 as one of its inputs. This "0" serves as an input to AND 123 thus producing a "0" on the digit 8 output. The outputs 0, 1, and 3 to 9 therefore all contain a "0" while the output 2 contains a "1" as required by the logic table of FIGURE 4. It is therefore evident that the system shown in FIGURE 1 is capable of translating the information contained on four wires into digital information contained on one of ten wires. It should be noted that the table shown in FIGURE 4 can be extended to include the digital outputs 10 through 15 and consequently the system shown in FIGURE 1 can likewise be extended to include the additional six outputs.

FIGURE 2 shows a second embodiment of the inventive circuit the operation of which is similar to that of FIGURE 1 but which contains less individual elements. In this embodiment the BCD information is received on input lines 201 through 204 which respectively represent the A, B, C, and D inputs of the FIGURE 4 logic table. A series of AND gates 205 through 214 receive the four-wire information. The outputs of AND gates 205 through 214 respectively represent the 0 through 9 digital output information. The system also includes two inverters 215 and 216 and two NAND gates 217 and 218. AND gates 205 through 212 are each three-input AND gates and therefore require a "1" on all three input leads in order to result in a "1" output.

The operation of this embodiment is similar to the operation of the embodiment of FIGURE 1. This is readily seen by following through one of the input combinations shown in the logic table of FIGURE 4. Assume that the digit 6 inputs are present on lines 201 through 204. This puts a "0" on lines A and D and a "1" on lines B and C and requires a "0" on all output lines except that of digit 6 which must be "1" to conform to the table. The "0" input present on input line 204 is fed directly to one input of each of AND gates 213 and 214 thereby resulting in a "0" output on the digit 8 and 9 output leads. NOR gate 217 receives a "1" input from lines 202 and 203 resulting in a "0" output of said NOR gate. This output serves as one of the inputs to each of AND gates 205 and 206 resulting in a "0" output on said AND gates. The digits 0 and 1 output lines therefore have a "0" output. NAND 218 receives a "1" input from lines 202 and 203 resulting in a "0" output of said NAND gate. This output serves as one of the inputs to AND gates 207 through 210 and therefore the digit outputs 2 through 5 of said AND gates is each a "0." AND gate 212 receives the "0" present on line 201 as an input and therefore the output of said AND is a "0." AND gate 211 receives a "1" input from each of lines 202 and 203. The third required "1" input to AND gate 211 is obtained from inverter 215 which inverts the "0" present on line 201 into a "1." The output of AND 211 is therefore a "1" on the digit 6 line, as required by the logic table. All the output lines 0 to 5 and 7 to 9 therefore contain a "0" output while output line 6 contains a "1" output. A similar analysis of the other digits in the FIGURE 4 table can also be made.

The embodiment shown in FIGURE 3 is similar in operation to the embodiment shown in FIGURES 1 and 2. The BCD information is fed to input lines 301 to 304 respectively labeled A, B, C and D. A first series of NAND gates 305 through 314 respectively feed both inputs of a second series of NAND gates 315 through 324. This connection of NAND gates is equivalent to a single series of AND gates similar to that shown in FIGURE 2. The connection of both input leads of each of NAND gates 315 to 324 to the same lead results in each of said NAND gates functioning as an inverter. This is evident by viewing FIGURE 6*a*. The outputs of NAND gates 315 to 324 serve as the 0 to 9 digit outputs. This embodiment also includes two AND gates 325 and 326 which receive both of their outputs from a single line. This type connection of an AND gate effectively is the same as not having the AND gate in the circuit, that is, the output is the same as the input. NAND gates 327 and 328 each receive both of their inputs from the same line. These NAND gates therefore operate as inverters as explained hereinabove. Another NAND gate 329 has its two inputs connected to lines 302 and 303. The equivalency of the cascaded NAND gates to an AND gate is the inverting function of NAND gates 327 and 328, and the effect of the common inputs in both input leads of AND gates 325 and 326 can easily be seen by referring to the logic circuitry of FIGURES 6*a*, 6*b* and 6*c*. This equivalency results in the embodiment of FIGURE 3 being the same as that of FIGURE 2. Although it initially appears that the use of two NAND gates, for example 305 and 315, in cascade instead of a single AND gate is an undue complication and expense; however there are sound reasons for such a practice. This is also true of the connections used for AND gates 325 and 326. The FIGURE 3 embodiment is easily obtained by the use of readily available thin film circuitry. The thin film circuit art has advanced to the stage where many circuits, called functional elements, are made in advance of any knowledge of their ultimate use in much the same manner as resistors are made. All forms of logic circuitry are made in this manner. The embodiment shown in FIGURE 3 is readily assembled from logic circuits available in thin film circuits. Because thin film circuitry is dimensionally quite small, a single wafer will ordinarily contain a plurality of logic circuits. A typical number of NAND gates available on a single wafer is four. Therefore all of NAND gates 305 to 324, a total of twenty gates, are available on five thin film wafers. Obviously a plurality of AND gates is also available on a single wafer and could be used. However, because the NAND gates permit both AND and NAND operation, as well as inverting, the most common thin film circuits are NAND gates. The primary advantage of the FIGURE 3 embodiment therefore is its ready adaptation to thin film techniques.

Although this invention has been described with respect to particular embodiments thereof, it is not to be so limited as changes and modifications may be made therein which are within the spirit and scope of the invention as defined by the appended claims.

I claim:

1. A system for connecting four-wire binary code decimal data into decade digital outputs representing ten digits from 0 to 9 comprising: four input leads for receiving said binary code decimal data; ten output leads for receiving said decade digital outputs; and conversion means connected between said input leads and said output leads for converting said binary code decimal data inputs into said decade digital outputs; said conversion means comprising ten AND function means the outputs of which are connected to said ten output leads, and conductive means interconnecting said four input leads to said ten AND function means, said conductive means including a first inverter means connected to the first input lead, a two input NOR function means with the inputs connected to the second and third input leads respectively, a second inverter means connected to the fourth input lead, and a two input NAND function means with the inputs connected to the second and third input leads, respectively, the outputs of said first inverter, said two input NOR function means, said conductive means connected to said ten AND function means in accordance with the following Boolean truth tables:

$$\overline{A.B+C.D},\ A.\overline{B+C.D},\ \overline{A.B.C}.B,\ A.\overline{B.C}.B,\ \overline{A.B.C}.C,$$
$$A.\overline{B.C}.C,\ \overline{A}.B.C,\ A.B.C,\ \overline{A}.D,\ A.D$$

where A, B, C, and D represent the inputs from said four-wire binary code.

2. The system of claim 1 wherein said AND function means are AND gates.

3. The system of claim 1 wherein said AND function means comprise series connected NAND gates.

References Cited

UNITED STATES PATENTS

| | | | |
|---|---|---|---|
| 3,026,509 | 3/1962 | Buser | 340—347 |
| 3,051,942 | 8/1962 | Galman | 340—347 |
| 3,052,411 | 9/1962 | Boese et al. | 235—155 |

OTHER REFERENCES

Wilkes: Automatic Digital Computers, June 14, 1956, pp. 227–229, John Wiley & Sons, Inc., New York, N.Y.

Boswell: "Code Conversion by Nor Logic," Instruments and Control Systems, Vol. 34, pp. 254–255; February 1961.

MAYNARD R. WILBUR, Primary Examiner

M. K. WOLENSKY, Assistant Examiner

U.S. Cl. X.R.

340—347; 307—207